US008786922B2

(12) United States Patent
Guay

(10) Patent No.: US 8,786,922 B2
(45) Date of Patent: Jul. 22, 2014

(54) PRINT COLOR MANAGEMENT

(75) Inventor: Randall G. Guay, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 12/274,520

(22) Filed: Nov. 20, 2008

(65) Prior Publication Data

US 2010/0123911 A1    May 20, 2010

(51) Int. Cl.
G03F 3/10 (2006.01)
H04N 1/60 (2006.01)
G06F 3/12 (2006.01)
G06K 9/00 (2006.01)

(52) U.S. Cl.
USPC ........... 358/527; 358/1.9; 358/1.13; 382/167; 382/162

(58) Field of Classification Search
USPC ........ 358/1.9, 527, 537, 538, 539, 1.16, 1.13, 358/540; 382/309, 167, 163
See application file for complete search history.

(56) References Cited

U.S. PATENT DOCUMENTS

| 5,872,895 | A * | 2/1999 | Zandee et al. ................. 358/1.9 |
| 6,040,927 | A * | 3/2000 | Winter et al. ................. 358/534 |
| 6,633,668 | B1 * | 10/2003 | Newman ........................ 382/166 |
| 6,643,029 | B2 * | 11/2003 | Kumada et al. ................ 358/1.9 |
| 6,836,345 | B1 * | 12/2004 | Setchell .......................... 358/1.9 |
| 6,991,319 | B2 * | 1/2006 | Zerza et al. ..................... 347/43 |
| 7,136,188 | B2 * | 11/2006 | Kondo ............................ 358/1.9 |
| 7,821,669 | B2 * | 10/2010 | Takabayashi et al. ......... 358/1.9 |
| 8,488,195 | B2 * | 7/2013 | Vrhel .............................. 358/1.9 |
| 8,531,692 | B2 * | 9/2013 | Lee et al. ...................... 358/1.13 |
| 2003/0053097 | A1 * | 3/2003 | Ohga et al. ..................... 358/1.9 |
| 2003/0117639 | A1 * | 6/2003 | Milton et al. ................. 358/1.13 |
| 2003/0142331 | A1 * | 7/2003 | Tanaka ........................... 358/1.9 |
| 2003/0161608 | A1 * | 8/2003 | Nishijima et al. .............. 386/20 |
| 2003/0177110 | A1 * | 9/2003 | Okamoto et al. ................ 707/3 |
| 2004/0135793 | A1 * | 7/2004 | Nakajima ...................... 345/591 |
| 2005/0122533 | A1 * | 6/2005 | Nakagawa ..................... 358/1.9 |
| 2005/0146736 | A1 * | 7/2005 | Matsuoka et al. ............. 358/1.9 |
| 2005/0174591 | A1 * | 8/2005 | Sowinski et al. .............. 358/1.9 |
| 2005/0253866 | A1 * | 11/2005 | Kim et al. ..................... 345/594 |
| 2006/0050288 | A1 * | 3/2006 | Aschenbrenner et al. ..... 358/1.9 |
| 2006/0188151 | A1 * | 8/2006 | Bailey et al. .................. 382/166 |
| 2006/0250623 | A1 * | 11/2006 | Newman et al. ............... 358/1.9 |
| 2006/0250629 | A1 * | 11/2006 | Morales et al. .............. 358/1.13 |
| 2006/0256407 | A1 * | 11/2006 | Hoshii ............................ 358/518 |
| 2007/0008560 | A1 * | 1/2007 | Eschbach ....................... 358/1.9 |

(Continued)

OTHER PUBLICATIONS

Color Workflows for Adobe Creative Suite 3; p. 16, 17, 18; 2008.

*Primary Examiner* — Madelein A Nguyen
(74) *Attorney, Agent, or Firm* — Steven R. Ormiston

(57) ABSTRACT

In one embodiment, computer readable instructions for: displaying together in a single display a group of user selectable icons each representing a discrete color scheme for printing an image; and then, in direct response to a user selecting one of the icons, displaying a color preview of the image as the image will appear when printed with the selected color scheme. In another embodiment, computer readable instructions for: allowing a user to select a color scheme, which selects a first color profile; allowing the user to select a printer, which selects a second color profile; identifying a third color profile for a display device; transforming image source data into image print data using the first and second color profiles; transforming the image print data into image display data using the second and third color profiles; and displaying the image on the display device using the image display data.

21 Claims, 11 Drawing Sheets

(56) References Cited

U.S. PATENT DOCUMENTS

| | | | |
|---|---|---|---|
| 2007/0046973 A1* | 3/2007 | Toda | 358/1.13 |
| 2007/0052987 A1* | 3/2007 | Jung | 358/1.9 |
| 2007/0064277 A1* | 3/2007 | Shimizu | 358/450 |
| 2007/0070469 A1* | 3/2007 | Oh et al. | 358/527 |
| 2007/0195345 A1* | 8/2007 | Martinez et al. | 358/1.9 |
| 2007/0195361 A1 | 8/2007 | Tomomatsu | |
| 2008/0062193 A1* | 3/2008 | Olson | 345/591 |
| 2008/0062443 A1* | 3/2008 | Olson | 358/1.9 |
| 2008/0174608 A1* | 7/2008 | Mahy et al. | 345/604 |
| 2008/0252915 A1* | 10/2008 | Jun | 358/1.9 |
| 2009/0244563 A1* | 10/2009 | Nordback | 358/1.9 |
| 2010/0046048 A1* | 2/2010 | Uotani et al. | 358/527 |
| 2012/0200578 A1* | 8/2012 | Yamakawa et al. | 345/501 |

* cited by examiner

PRINT COLOR MANAGEMENT

BACKGROUND

Users create and manipulate images on a computer while viewing the images on a monitor. Ordinarily, an image looks different when viewed on a monitor than it does when printed. Images are usually displayed on a monitor in an RGB (red, green, blue) color space. Images are usually printed in a CMY (cyan, magenta and yellow) or CMYK (cyan, magenta, yellow and black) color space. RGB image color values are converted to CMY or CMYK image color values for printing the image. The range of colors that can be displayed on a monitor in RGB color space is usually larger and brighter than the range of colors that can be printed. Hence, the image on a monitor may not accurately portray the printed image.

DRAWINGS

DESCRIPTION

The new color management techniques of the present disclosure were developed in an effort to provide users with an easy to use tool for selecting different color schemes for printing color images and accurately previewing those images on a display device as those images will actually appear when printed. One example embodiment of the new color management tool will be described with reference to a color management application implemented like a printer driver residing on a host computer. Other embodiments are possible. Thus, nothing in the following description should be construed to limit the scope of the disclosure.

Figure 1:
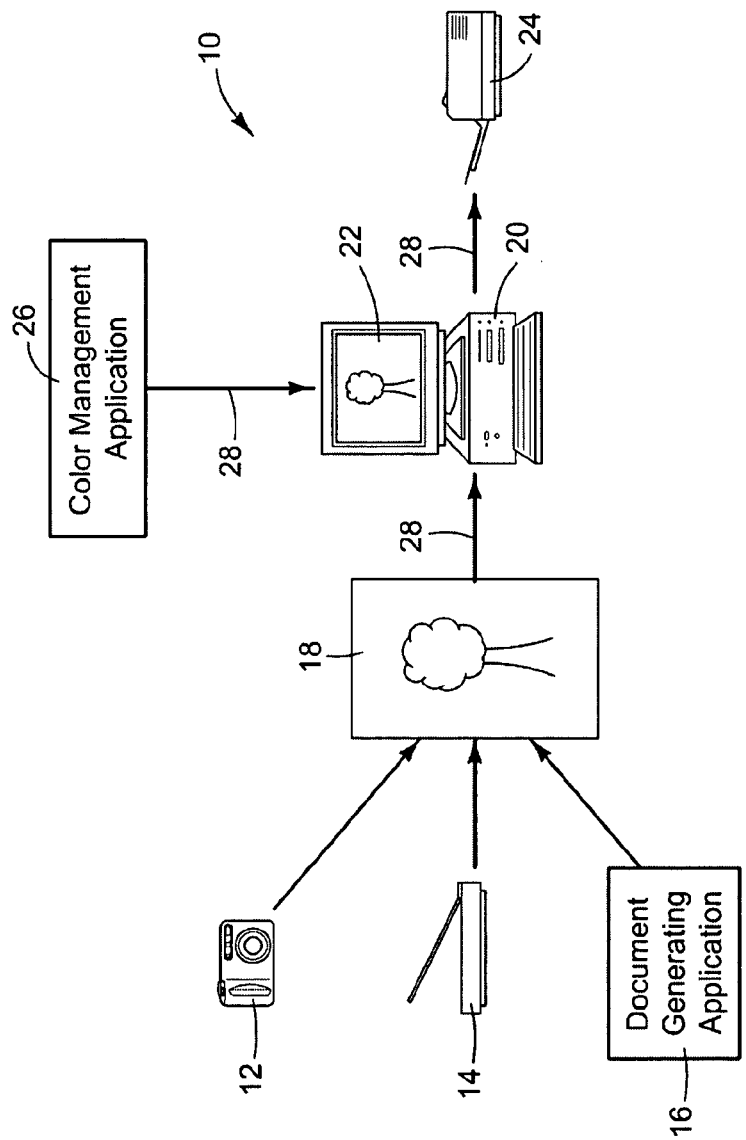
FIG. 1 is a schematic representation of a printing system that illustrates one environment in which embodiments may be implemented.

FIG. 1 is a schematic representation of a printing system 10 illustrating one environment in which embodiments of the disclosure may be implemented. Referring to FIG. 1, system 10 includes image sources 12, 14 and 16, an image 18, a computer 20, a display device 22, a printer 24 and a color management application 26. The image sources may include, for example, a digital camera 12, a scanner 14 and document generating application 16. The display device may include, for example, a monitor 22 associated with computer 20. Printer 24 represents generally any combination of hardware and programming capable of processing a print job and producing an image such as text and graphics on a print media such as paper. Examples of a printer 24 include laser printers, inkjet printers, and multi-function printing devices.

Image sources 12, 14 and 16, computer 20, display device 22, printer 24 and color management application 26 are interconnected by communication links 28. Each link 28 represents generally any connection that provides electronic communication between components including, for example, internal circuitry (e.g., when two components reside on the same device), cables, wireless links, an intranet, and/or the Internet. Color management application 26 may reside on a print service web site where it is accessible to a user through the Internet. A web based color management application 26 may execute at the web site or at a user computer 20 after download, or a combination of both. As described below with reference to FIG. 2, color management application 26 may be implemented like a printer driver or other programming residing on computer 20. Other implementations for color management application 26 are possible.

Figure 2:
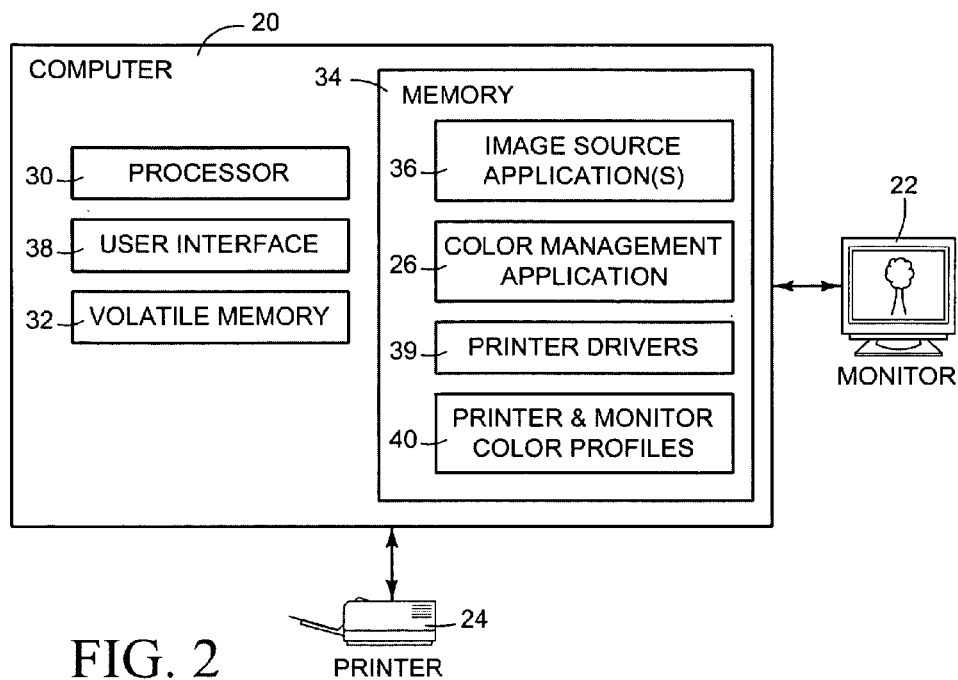
FIG. 2 is a block diagram showing components of a computer, such as the computer shown in FIG. 1, according to an embodiment in which the color management application resides on the computer.

FIG. 2 is a block diagram showing components of a computer 20 according to one embodiment in which color management application 26 resides on computer 20. The block diagram of FIG. 2 depicts exemplary physical and logical components for implementing the functionality of color management application 26. Referring to FIG. 2, computer 20 includes a processor 30, a volatile memory 32 (e.g., RAM), and a nonvolatile memory 34 (e.g., a hard disk). Nonvolatile memory 34 provides storage for computer/processor readable instructions and other data for computer 20. Computer 20 runs image source application programs 36 stored in memory 34 and executed by processor 30 that generate or manipulate images that may be communicated electronically through links 28 to monitor 22 and printer 24 for viewing and printing. Image source applications 36 may include, for example, illustrators, photograph imaging and editing programs, publishing programs, browsers, word processors and multimedia players. A user interface 38, typically implemented through monitor 22 and a keyboard and mouse (not shown), allows a user to input data and control operation of computer 20.

Computer 20 also includes color management application 26, printer drivers 39 and color profiles 40 stored in memory 34 and executed by processor 30. As is typical, a printer driver 39 for a printer 24 generates a print job for transmission to printer 24 including, for example, formatting images from application programs 36, as necessary, into a page description language (PDL) such as Adobe PostScript or another format suitable for use by printer 24 and adding appropriate printer commands to the print data. As described in more detail below with regard to FIG. 3, color management application 26 provides functionality for previewing color images on monitor 22 as those images will actually appear when printed with printer 24 and for printing those images according to a set of discrete user-selectable color schemes. Thus, color management application 26 represents generally any combination of programming, data and/or hardware configured to achieve this functionality.

Figure 3:
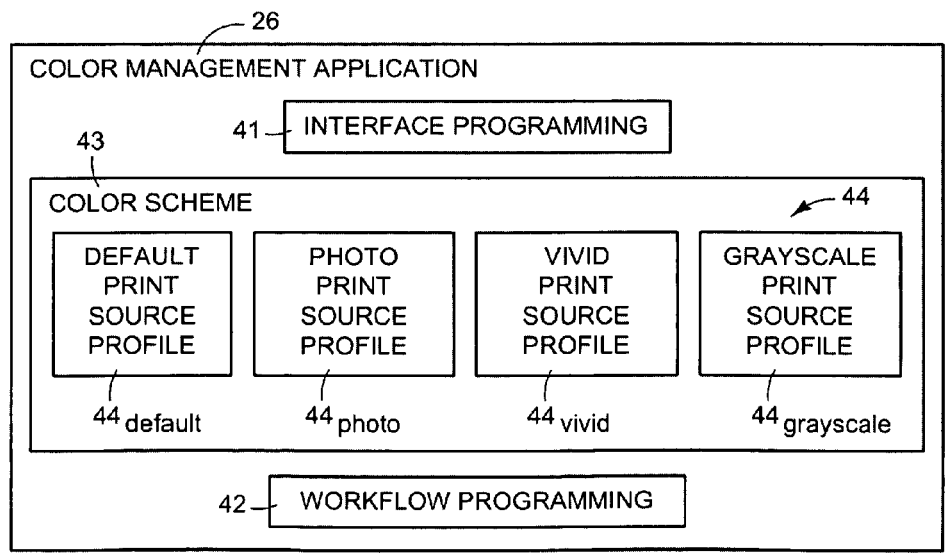
FIG. 3 is a block diagram showing components of a color management application, according to an embodiment.
Figure 4:
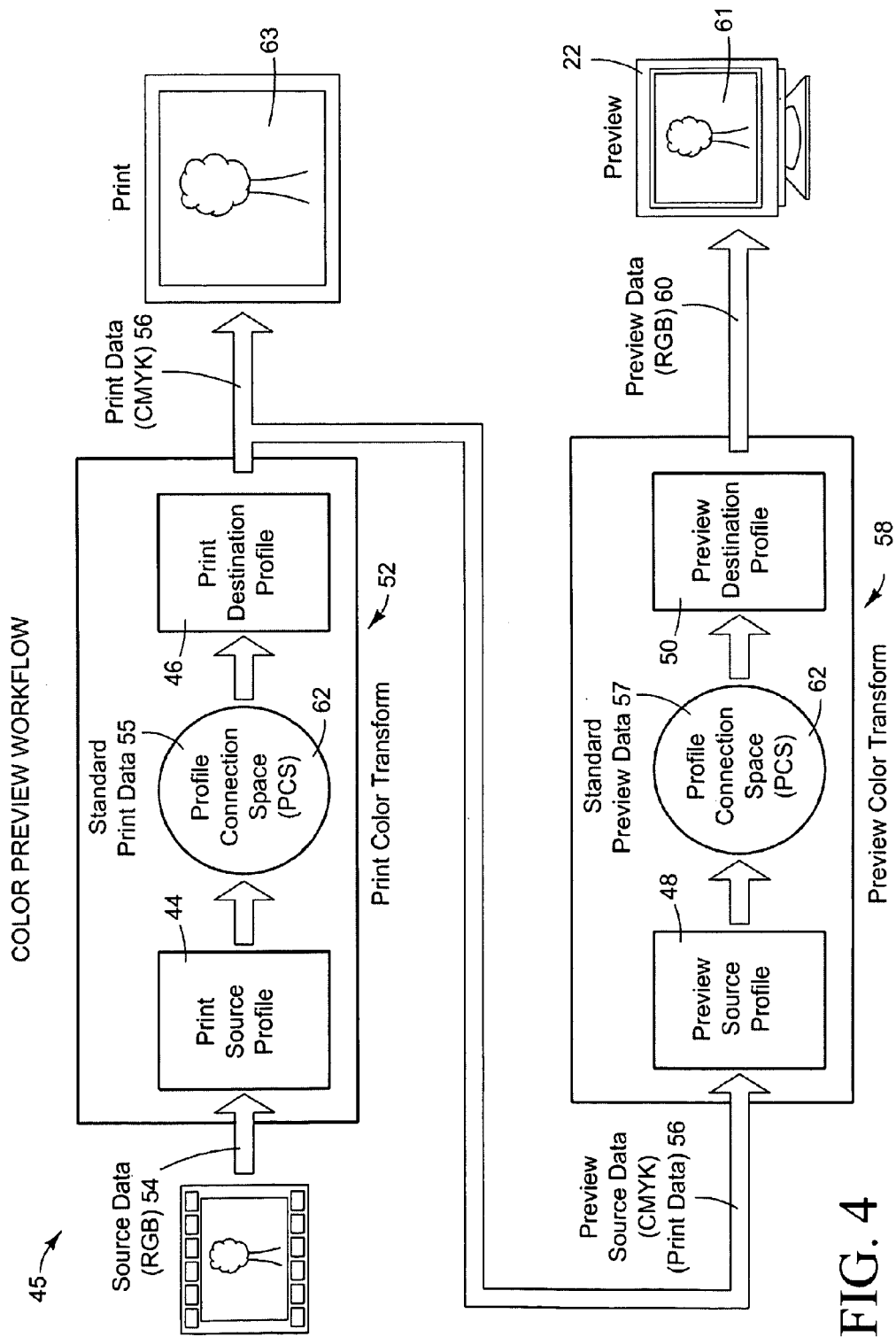
FIG. 4 is a block diagram illustrating a color preview workflow implemented through a color management application, such as the color management application shown in FIG. 3, according to an embodiment.

FIG. 3 is a block diagram showing components of one embodiment of a color management application 26. FIG. 4 is a block diagram illustrating a color preview and printing workflow implemented through color management application 26. Referring first to FIG. 3, color management application 26 includes interface programming 41, workflow programming 42, and color schemes 43. Interface programming 41 represents generally functionality for coordinating data flow between color management application 26 and external components, such as printer drivers 39 and color profiles 40.

Interface programming 41 accesses printer driver functions associated with a specific printer. For example, in the embodiment described below with reference to FIGS. 5-11, the user has selected an HP Color LaserJet CP2020 for printing. Thus, driver functions accessed by interface programming 41 will include those driver functions corresponding to an HP Color LaserJet CP2020 that are not unique to the new color management process. Interface programming 41 may contain a predefined set of printer data representing printer drivers 39 (and their functions) and the corresponding printers available to color management application 26. In such case, the application of color management application 26 would be limited to the printers represented in this predefined set of printer data. Alternatively, for another example, interface programming 41 may acquire printer data representing printer drivers 39 (and their functions) stored on computer 20 (independent of color management application 26) and the corresponding printers available to computer 20. In such case, the printers available to color management application 26 would be determined by those printers enabled through drivers 39 on computer 20.

Workflow programming 42 represents generally functionality in color management application 26 for implementing color schemes 43. (Depicting interface programming 41 and workflow programming 42 with separate blocks in the diagram of FIG. 3 is for convenience only, to help illustrate these functions of color management application 26, and does not imply any particular configuration or location of the programming components of interface 41 and or workflow 42.) Color schemes 43 are associated with print source color profiles 44. In the embodiment shown, each of four color profiles $44_{default}$, $44_{photo}$, $44_{vivid}$ and $44_{grayscale}$ are associated with a corresponding set of four discrete color schemes, described in more detail below with reference to FIGS. 8-12. A color profile transforms colors from one color space to another color space. Color profiles are sometimes also referred to as color "transforms" and the transformation process is sometimes referred to as "mapping" colors from one color space to another color space.

Referring now also to workflow 45 in FIG. 4, in a print color transform 52, RGB image source color data 54 is transformed into CMYK image print color data 56 using a print source profile 44 and a print destination profile 46. Then, in a preview color transform 58, the CMYK print color data 56 is transformed into RGB image preview color data 60 using a preview source profile 48 and a preview destination profile 50. Generating preview color data 60 from print color data 56 results in a preview image 61 on monitor 22 (FIG. 2) that accurately portrays the image 63 as it will appear when printed with printer 24 (FIG. 2). "Accurate" in this context refers to the relatively greater color accuracy achieved when preview image 61 is displayed using preview color data 60 generated from print color data 56, rather than from image source color data 54 or from another source of image color data. The absolute accuracy of preview image 61 compared to printed image 63 may be affected by other factors. For example, a calibrated, wide gamut monitor 22 viewed under optimum lighting conditions will display an image 61 that is the same or very nearly the same color as the printed image 63 when the printed image is also viewed under optimum lighting conditions. An uncalibrated monitor 22 and/or less than optimum lighting conditions, however, will reduce the accuracy of preview image 61.

In the embodiment shown in FIG. 4, both the print transform 52 and the preview transform 58 include a Profile Connection Space (PCS) 62. PCS 62 represents generally any suitable device independent color space, such as that adopted by the International Color Consortium (ICC). Where an ICC PCS is used in color transform 52, RGB image source color data 54 is transformed into XYZ or L*a*b* space standard color data 55 at PCS 62 using print source profile 44. Standard color data 55 is transformed into CMYK image print color data 56 using print destination profile 46. Similarly, in preview color transform 58, CMYK print color data 56 is transformed into standard color data 57 at PCS 62 using preview source profile 48. Standard color data 57 is transformed into RGB image preview color data 60 using preview destination profile 50.

ICC color transforms to and from the ICC standard (device independent) color space are embedded in ICC color profiles. Where the ICC Profile Connection Space is used for PCS 62, ICC color profiles are used for profiles 44-50. For ICC color profiles, profile 46 for transforming ICC PCS standard color data to CMYK print data and profile 48 for transforming CMYK print data to ICC PCS standard color data would be parts of a single color profile. References to a color profile in this document, therefore, includes the corresponding transform functionality whether or not that functionality is included as one or more parts of a single profile and/or as plural profiles. ICC PCS color profiles are well known and commonly used throughout the printing industry. Thus, although embodiments may be implemented using device dependent color profiles in which color data is transformed directly from the source color space to the destination color space using a single device dependent color, it is expected that a PCS, specifically an ICC PCS, will be used for many implementations.

Figure 5:
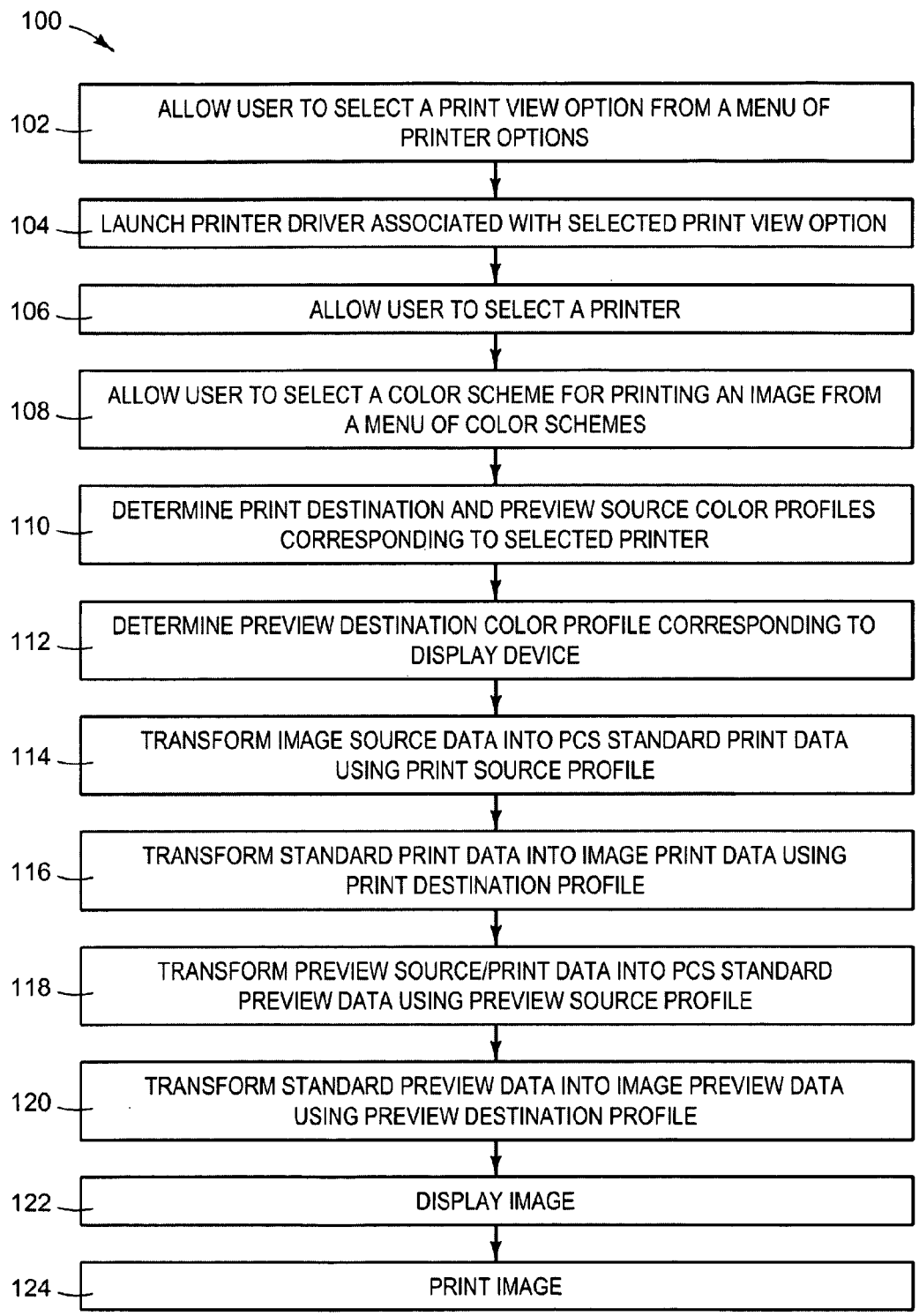
FIG. 5 is a flow diagram illustrating a method for previewing and printing a color image, according to an embodiment.

FIG. 5 is a flow diagram illustrating a method 100 for previewing and printing a color image. FIGS. 6-11 are "screen shots" illustrating user interface displays corresponding to some of the acts in method 100. Method 100 in FIG. 5 may be implemented, for example, in the environment shown in FIG. 1 through a color management application 26 and workflow 45 described above with reference to FIGS. 2-4. In the following description of method 100, therefore, reference is made to components shown in FIGS. 1-4.

Figure 6:
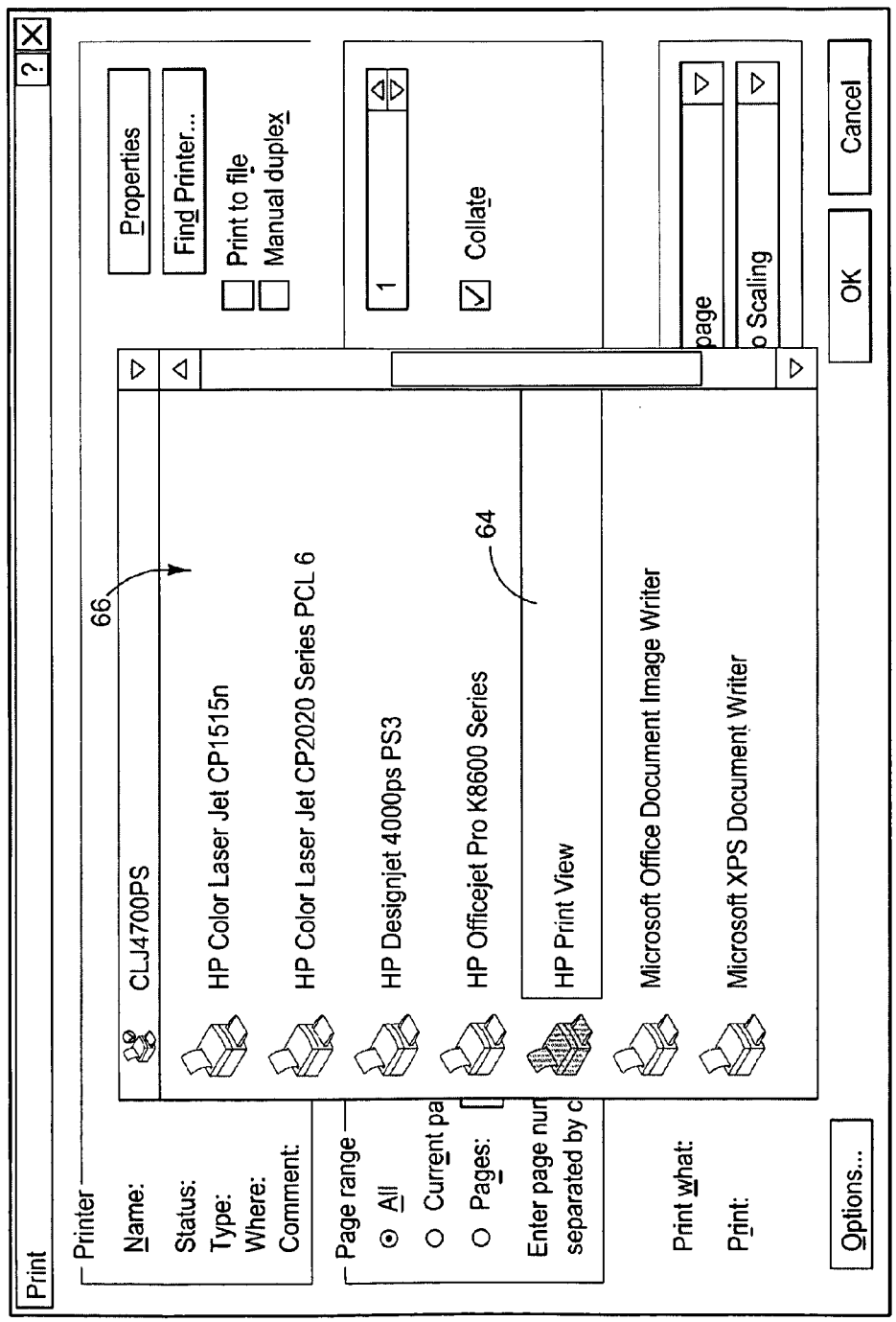
FIGS. 6 and 7 illustrate a user interface display for launching an image preview and printing workflow, according to an embodiment.
Figure 7:
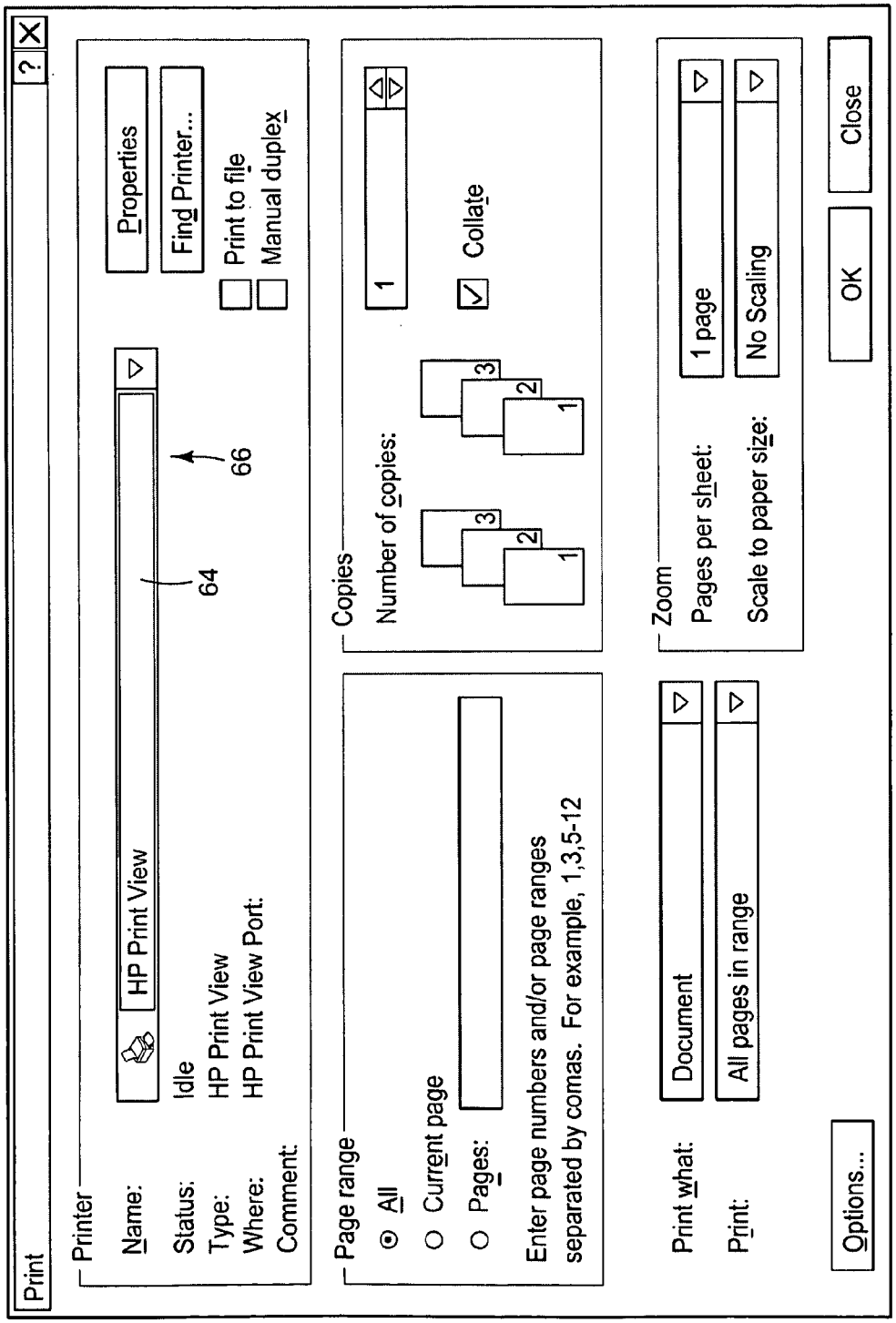

Referring to FIG. 5, print preview method 100 begins by, for example, allowing a user to select a Print View option from a menu of printer options displayed when a user chooses to print an image from an image source application 36 running on computer 20 (block 102). A user selection of the Print View option 64 from a drop down menu 66 of printer options is illustrated in the displays of FIGS. 6 and 7. Clicking "OK" in the display of FIG. 7, for example, completes the selection of Print View option 64 and launches workflow programming 42 associated with Print View option 64 (block 104). Then, the user is allowed to select a printer for actually printing the image from a menu of available printers (block 106). A user selection of an HP Color LaserJet CP2020 printer 68 from a printer menu 70 is shown in the displays of FIGS. 8-11. As with conventional printer menus, a default printer may be assigned in the absence of an affirmative user selection.

Figure 8:
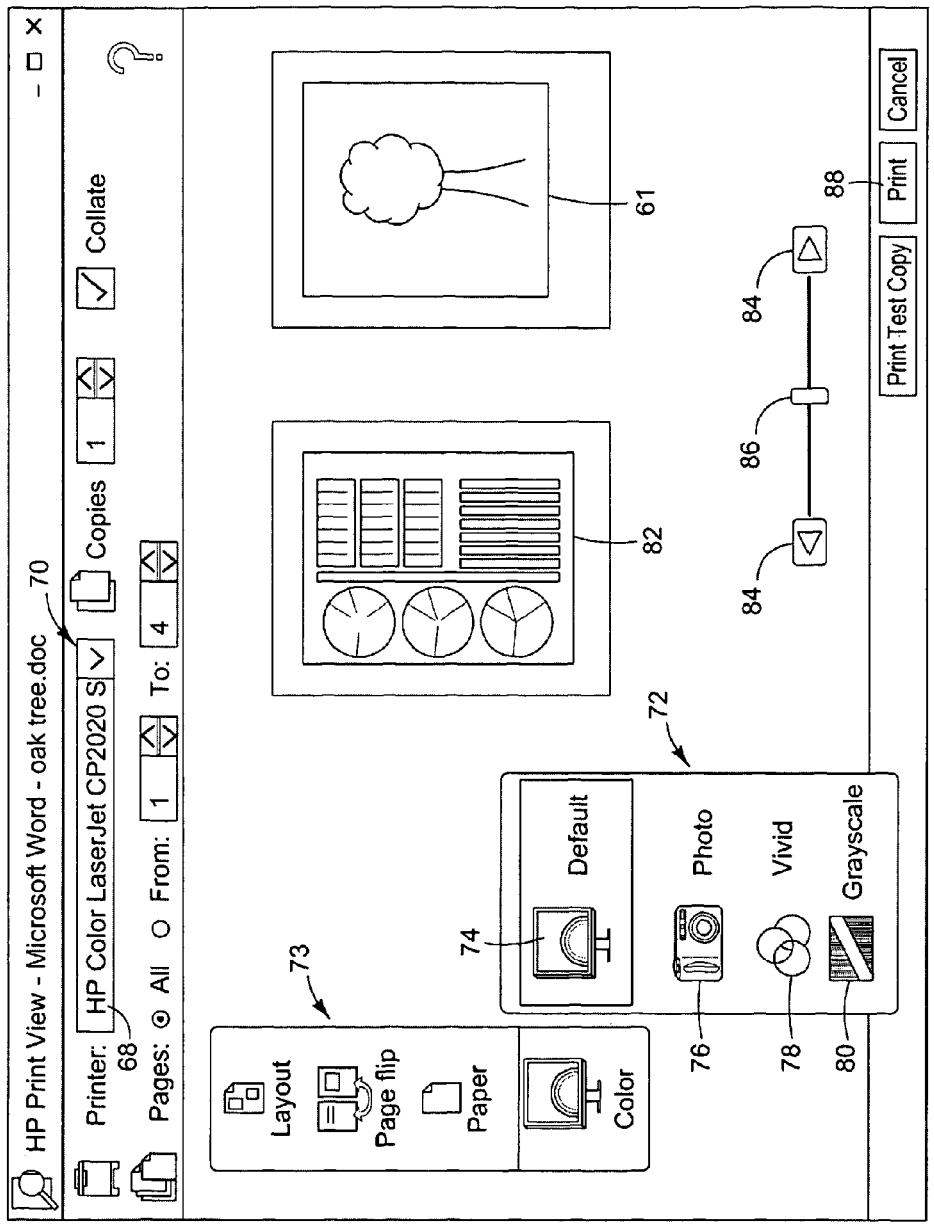
FIGS. 8-11 illustrate a user interface display for selecting a color scheme and previewing a print image in an image preview and printing workflow, according to an embodiment.
Figure 9:
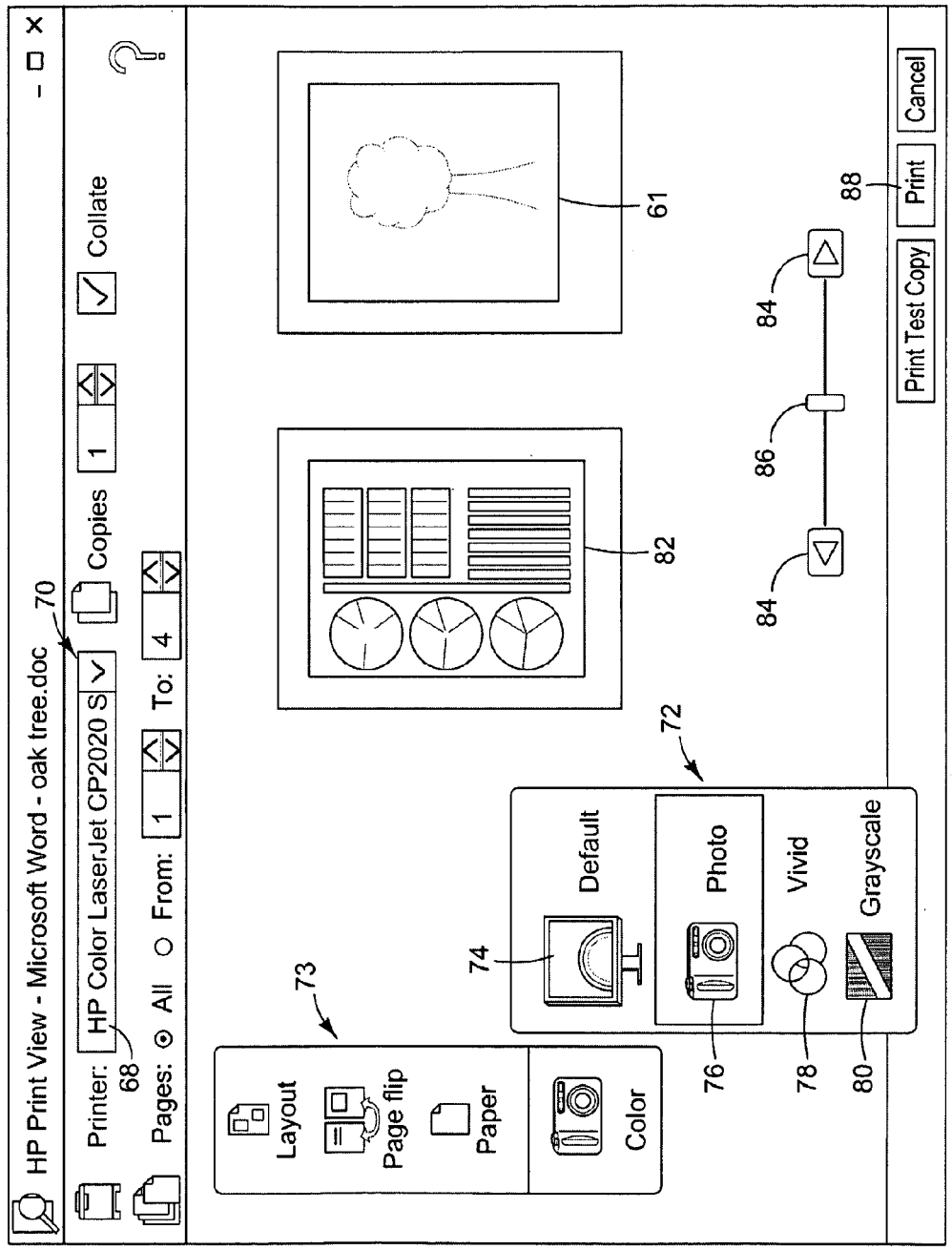
Figure 10:
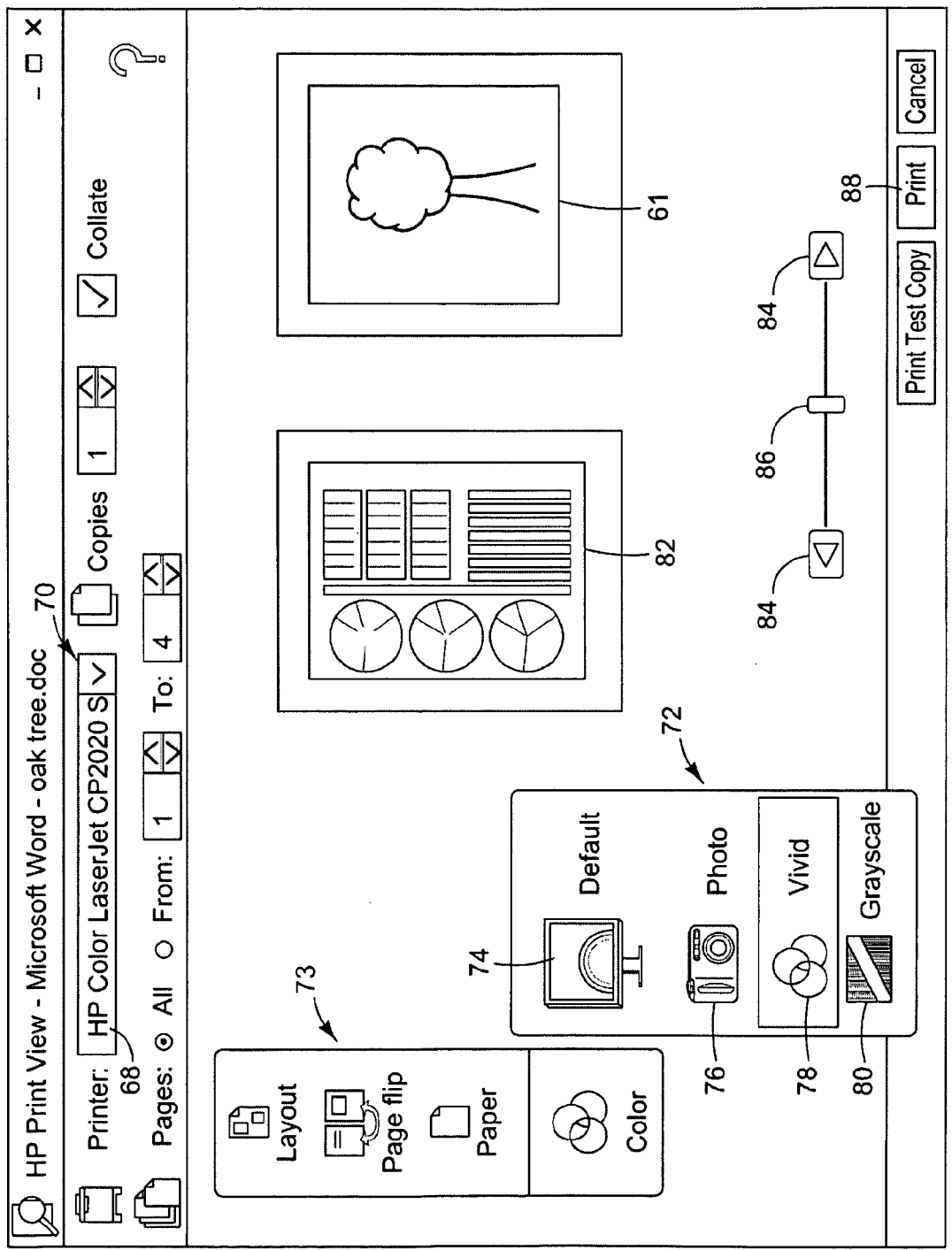
Figure 11:
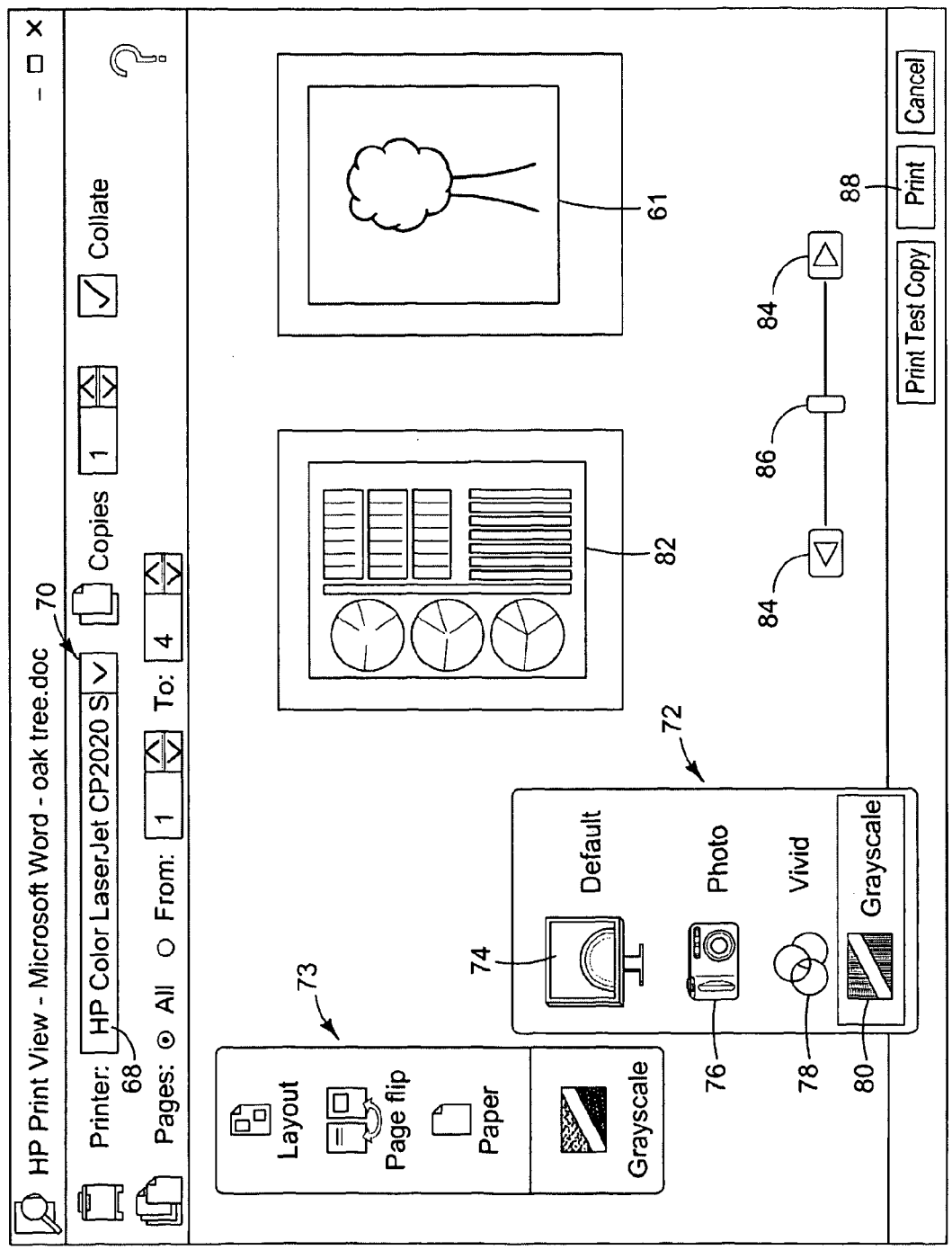
Figure 12:
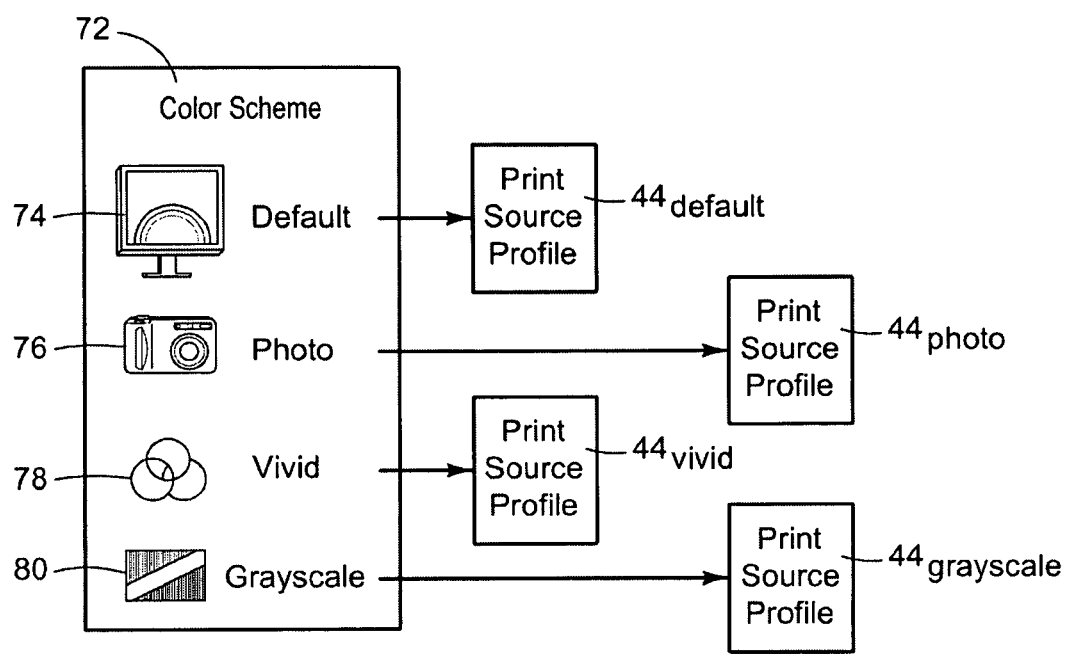
FIG. 12 is a block diagram illustrating color profiles associated with different color scheme options, according to an embodiment.

The user is also allowed to select a color scheme for printing an image from a menu of color schemes (block 108). In the embodiment shown in the display of FIGS. 8-11, for example, the user is presented with a menu 72 of four discrete print color schemes 74, 76, 78 and 80. Default color scheme 74 may be assigned in the absence of an affirmative user selection, as shown in the display of FIG. 8. Selection of the Photo color scheme 76 is shown in FIG. 9. Selection of the Vivid color scheme 78 is shown in FIG. 10. Selection of the Grayscale color scheme 80 is shown in FIG. 11. As with conventional printer drivers, a menu 73 may provide user selectable options for paper/media type, layout, finishing options and other such print settings. In the embodiment shown, menu 73 also displays the selected color scheme option. Each color scheme 74, 76, 78 and 80 represents a different treatment of the image source color data. Accordingly, a different print source color profile 44 for the image source data is associated with each color scheme 74, 76, 78 and 80. Color profiles $44_{default}$, $44_{photo}$, $44_{vivid}$ and $44_{grayscale}$ associated with color schemes 74, 76, 78 and 80, respectively, are shown in FIG. 12. For example, color profile $44_{default}$ associated with a default color scheme 74 may be configured to optimize graphics for saturated color in the printed image, color profile $44_{photo}$ associated with a photo color scheme 76 may be configured to provide a realistic photograph in the printed image, color profile $44_{vivid}$ associated with a vivid color scheme 78 may be configured to intensify pastels, and color profile $44_{grayscale}$ associated with grayscale color scheme 80 may be configured for monochrome printing.

The color profile initially attached to the image source color data by an image source 12, 14 and 16 or by an application program 36 is ignored and workflow programming 42 imposes a source color profile 44 associated with the selected color scheme 74, 76, 78 or 80. For example, a jpeg image from a digital camera 10 initially may have an RGB color profile based on a camera 10 or based on a photo editing application 36. Workflow programming 42 in color management application 26 interprets the RGB image source data using the new profile $44_{default}$, $44_{photo}$, $44_{vivid}$ or $44_{grayscale}$, for example, by "stripping" the initial color profile from the RGB image source data and attaching a color profile associated with the selected color scheme 74, 76, 78 or 80 or by sending specific commands to printer 24 which override the initial color profile settings.

With continuing reference to FIG. 5, the print destination and preview source color profiles 46 and 48 corresponding to the selected printer 24 are determined at block 110. Thus, in the embodiment shown, print destination color profile 46 is an ICC profile for transforming PCS color values from the image source data into CMYK color values for print data for an HP Color LaserJet CP2020 printer 24, and preview source color profile 48 is an ICC profile for transforming the print data CMYK color values into PCS color values for printer 24. The color profiles 46 and 48 associated with the selected printer 24 may be determined, for example, from a list of printers and corresponding color profiles 40 accessible to color management application 26, or by querying the selected printer 24 for the appropriate color profiles.

The preview destination color profile 50 corresponding to display device 22 is determined at block 112, for example, by interface programming 41 interrogating the computer 20 operating system, or by interrogating display device 22 directly, for the appropriate color profile.

In direct response to the user selecting a color scheme 74, 76, 78 or 80: image source color data 54 is transformed into PCS standard print data 55 using the corresponding print source profile 44, at block 114; standard print data 55 is transformed into print color data 56 using print destination profile 46, at block 116; print color data 56 is used as the source data for the preview color transform 58 in FIG. 4, and preview source color data 56 is transformed into PCS standard preview data 57 using preview source profile 48, at block 118; standard preview data 57 is transformed into preview color data 60 using preview destination profile 50, at block 120; and preview color data 60 is displayed on monitor 22 at block 122, as shown in FIGS. 8-11. The image is printed, at block 124.

Referring to FIGS. 8-11, the effect of each color scheme 74, 76, 78 and 80 may be displayed using a color chart 82 along with preview image 61. Different images appearing in a multi-page document may be previewed, for example, using direction arrows 84 and slider 86. Of course, the actual effect of each color scheme 74, 76, 78 and 80 on a color image cannot be shown in a monochrome line drawing. Thus, the actual effect of a color scheme 74, 76, 78 and 80 is not shown in color chart 82 or in preview image 61 in FIGS. 8-11. Differences between each color scheme 74, 76, 78 and 80 are depicted generally in preview image 61 by a change in the line weight of the tree outline in image 61 in FIGS. 8-11. The user may change the preview image 61 by selecting a different color scheme icon 74, 76, 78 and 80. Thus, for example, a user previewing an image as it will appear when printed using Default color scheme 74, as shown in FIG. 8, may preview the image as it will appear when printed using the Photo color scheme 76 simply by clicking on the camera icon 76 in color scheme menu 72. In direct response to selecting a different color scheme, Photo scheme 76 in this example, color management programming 42 automatically re-runs print and preview color transforms 52 and 58 using print source profile $44_{photo}$ to generate the preview image 61 shown in FIG. 9. Similarly, a user wishing to preview an image as it will appear when printed with a different printer may select another printer from printer menu 70 and, in direct response to selecting the printer, color management programming 42 automatically re-runs print and preview color transforms 52 and 58 using print destination and preview source profiles 46 and 48 associated with the newly selected printer.

Once the user has decided on a desired color scheme 74, 76, 78 and 80, completion of the printing process is initiated by selecting/clicking print button 88. In response to selecting print button 88, color management application 26 completes the print job, implementing the selected color scheme represented by image print color data 56, using driver functions corresponding to the selected printer (printer selection 68 in FIGS. 8-11) and sends the print job to printer 24.

The use of the four color schemes 74, 76, 78 and 80 is just one example. More or fewer color schemes may be used reflecting the same or other color treatments. The exact number of color of schemes and the specific treatment afforded by each scheme may be varied from that shown and described and still give the user a practical, easy to use tool for customizing the color in a printed image, as an alternative to the comparatively complicated color management programs currently available. A small array of discrete "pre-packaged" color schemes automatically and accurately previewed, such as schemes 74, 76, 78 and 80 previewed through workflow 45, makes it easy for virtually any user to customize the color in a printed image before printing the image and without any training or any familiarity with conventional color editing programs. While the range of color outcomes may be limited compared to complicated color editing programs, the ease of use and accuracy of the preview makes the new color management tool a desirable alternative for many users.

Printing system 10 in FIG. 1 is an example environment in which embodiments of the present disclosure may be implemented. Implementation, however, is not limited to this environment. The diagrams of FIGS. 2-5 show architecture, functionality, and operation of an example embodiment. Some of the components illustrated in FIGS. 2-4 represent computer programs and/or data used with a computer program. Each such component, portion thereof, or combinations thereof may represent in whole or in part a module, segment, or portion of programming that comprises one or more executable instructions and/or data to implement a logical function(s). Each component or various combinations thereof may represent a circuit or a number of interconnected circuits to implement the specified logical function(s). Although the flow diagram of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence.

Some components may be embodied in a computer readable media for use by or in connection with an instruction execution system such as a computer/processor based system or an ASIC (Application Specific Integrated Circuit) or other system that can fetch or obtain the logic from computer-readable media and execute the instructions contained therein. Computer readable media may be any media that can contain, store, or maintain programs and data for use by or in connection with the instruction execution system. Computer readable media may comprise any one of many physical media such as, for example, electronic, magnetic, optical, electromagnetic, or semiconductor media. More specific examples of suitable computer readable media include, but are not limited to, a portable magnetic computer diskette such as floppy diskettes or hard drives, a random access memory (RAM), a read-only memory (ROM), an erasable programmable read only memory, or a portable compact disc.

The present disclosure has been shown and described with reference to the foregoing exemplary embodiments. It is to be understood, however, that other forms, details and embodiments may be made without departing from the spirit and scope of the disclosure which is defined in the following claims.

What is claimed is:

1. A non-transitory computer readable medium having computer executable instructions thereon for performing a method comprising:
displaying together in a single display a group of user selectable icons each representing a discrete predefined color scheme to produce a corresponding predefined visual effect in an image printed using that color scheme; and then
in direct response to a user selecting one of the icons, selecting a predefined first color profile associated with the color scheme represented by the selected icon, the first color profile usable to transform data from an image source into first PCS data that is subsequently transformed into image print data, the first color profile corresponding to the selected visual effect and not specific to any image source, and displaying a color preview of the image as the image will appear when printed with the color scheme represented by the selected icon by transforming the image print data into second PCS data and transforming the second PCS data into image data of the color preview.

2. The medium of claim 1, wherein the method further comprises, for the same image, repeating the act of displaying a color preview in direct response to any change in the color scheme icon selection.

3. The medium of claim 1, wherein displaying a color preview comprises:
identifying a second color profile for a display device;
transforming the image print data into image display data using the second color profile; and
displaying a preview of the image on the display device using the image display data.

4. The medium of claim 1, wherein the method further comprises:
allowing the user to select a printer for printing the image;
associating a printer color profile with a user selected printer;
transforming the first PCS data into the image print data using the printer color profile; and
wherein the displaying a color preview comprises
transforming the image print data into image display data using the printer color profile and a preview color profile associated with a display device, the preview color profile different from the first color profile; and
displaying a preview of the image on the display device using the image display data.

5. The medium of claim 4, wherein the method further comprises, for the same image, repeating the act of displaying a color preview in direct response to any change in the color scheme icon selection and/or in the printer selection.

6. The medium of claim 4, wherein the method further comprises printing the image on the printer using the image print data.

7. The medium of claim 1, wherein the predefined visual effect is: optimizing graphics for saturated color in the printed image, providing a realistic photograph in the printed image, intensifying pastel colors in the printed image, or providing a monochrome printed image.

8. The medium of claim 1, wherein each predefined visual effect is independent of the characteristics of an image input or output device.

9. A non-transitory computer readable medium having computer executable instructions thereon for performing a method comprising:
allowing a user to select a discrete predefined color scheme for producing a corresponding predefined visual effect in an image printed using that color scheme, which selects a predefined first color profile, associated with the selected color scheme, that corresponds to the selected visual effect and is not specific to an image source;
allowing the user to select a printer for printing the image, which selects a second and a third color profiles;
identifying a fourth color profile for a display device;
transforming image source data from the image source into image print data using the first and second color profiles;
transforming the image print data into image display data using the third and fourth color profiles; and
displaying the image on the display device using the image display data.

10. The medium of claim 9, wherein the method further comprises, for the same image, repeating the acts of transforming and displaying whenever a change is made to the color scheme selection and/or to the printer selection.

11. The medium of claim 10, wherein allowing a user to select a color scheme which selects a first color profile includes displaying together in a single display a group of user selectable icons each representing a discrete color scheme for printing the image.

12. The medium of claim 9, wherein the method further comprises:
presenting a "Print View" option as a selection in a menu of printer drivers displayed in response to a user request to print an image from an image source application; and
in response to the user selecting the "Print View" option as the desired printer driver, initiating a color management application that performs the acts of allowing, the act of identifying, the acts of transforming, and the act of displaying.

13. The medium of claim 9, wherein the transforming image source data into image print data comprises:

transforming the image source data into profile connection space data using the first color profile; and transforming the profile connection space data into the image print data using the second color profile.

14. The medium of claim 9, wherein the fourth color profile is different from the first color profile.

15. A non-transitory computer readable medium having computer executable instructions thereon for performing a method comprising:

associating a different predefined source color profile with each of a plurality of discrete predefined color schemes for producing a corresponding predefined visual effect in an image printed using that color scheme, each source color profile corresponding to a respective predefined visual effect and not specific to an image source;

displaying together in a single display a group of user selectable icons each representing one of the color schemes;

transforming image source data from the image source into profile connection space first data using the source color profile associated with a user selected one of the color schemes;

transforming the profile connection space first data into image print data using a first color profile for a printer;

transforming the image print data into profile connection space second data using a second color profile for the printer; and transforming the profile connection space second data into image display data using a color profile for a display device.

16. The medium of claim 15, wherein the first and second color profiles for the printer comprise parts of a single color profile.

17. The medium of claim 15, wherein the method further comprises:

displaying the image on the display device using the image display data; and for the same image, repeating the acts of transforming and the act of displaying the image whenever a change is made to the user selected color scheme.

18. The medium of claim 17, wherein the method further comprises:

allowing a user to select a printer for printing the image; and associating the first color profile with the user selected printer for transforming profile connection space data into print data and associating the second color profile with the user selected printer for transforming print data into profile connection space data; and wherein:

transforming the profile connection space first data into image print data comprises transforming the profile connection space first data into image print data using the first color profile associated with the user selected printer; and transforming the image print data into profile connection space second data comprises transforming the image print data into profile connection space second data using the second color profile associated with the user selected printer.

19. The medium of claim 18, wherein the method further comprises, for the same image, repeating the acts of transforming and the act of displaying the image whenever a change is made to the user selected printer.

20. The medium of claim 15, wherein the method further comprises:

presenting a "Print View" option as a selection in a menu of printer drivers displayed in response to a user request to print an image from an image source application; and in response to the user selecting the "Print View" option as the desired printer driver, initiating a color management application that performs the act of associating, the act of displaying, and the acts of transforming.

21. The medium of claim 15, wherein the color profile for the display device is different from the source color profiles.

* * * * *